(12) United States Patent
Kloppenburg et al.

(10) Patent No.: US 10,611,855 B2
(45) Date of Patent: Apr. 7, 2020

(54) HETEROATOM CONTAINING MODIFIED DIENE POLYMERS

(71) Applicant: ARLANXEO Deutschland GmbH, Dormagen (DE)

(72) Inventors: Heike Kloppenburg, Duesseldorf (DE); Thomas Ruenzi, Neuss (DE)

(73) Assignee: ARLANXEO DEUTSCHLAND GMBH, Dormagen (DE)

( * ) Notice: Subject to any disclaimer, the term of this patent is extended or adjusted under 35 U.S.C. 154(b) by 3 days.

(21) Appl. No.: 15/548,782

(22) PCT Filed: Jan. 5, 2016

(86) PCT No.: PCT/EP2016/050065
§ 371 (c)(1),
(2) Date: Aug. 4, 2017

(87) PCT Pub. No.: WO2016/124340
PCT Pub. Date: Aug. 11, 2016

(65) Prior Publication Data
US 2018/0237546 A1    Aug. 23, 2018

(30) Foreign Application Priority Data
Feb. 6, 2015 (EP) ..................... 15154135

(51) Int. Cl.
| | |
|---|---|
| C08C 19/12 | (2006.01) |
| C08C 19/20 | (2006.01) |
| B60C 1/00 | (2006.01) |
| C08C 19/14 | (2006.01) |
| C08C 19/44 | (2006.01) |
| B29C 35/02 | (2006.01) |
| C08C 19/32 | (2006.01) |
| B29K 9/06 | (2006.01) |
| B29L 23/00 | (2006.01) |
| B29L 30/00 | (2006.01) |
| B29L 31/00 | (2006.01) |
| B29L 31/26 | (2006.01) |
| B29L 31/30 | (2006.01) |
| B29L 31/56 | (2006.01) |

(52) U.S. Cl.
CPC .............. C08C 19/20 (2013.01); B29C 35/02 (2013.01); B60C 1/00 (2013.01); B60C 1/0016 (2013.01); C08C 19/14 (2013.01); C08C 19/32 (2013.01); C08C 19/44 (2013.01); B29K 2009/06 (2013.01); B29L 2023/005 (2013.01); B29L 2030/002 (2013.01); B29L 2031/001 (2013.01); B29L 2031/26 (2013.01); B29L 2031/3017 (2013.01); B29L 2031/56 (2013.01); B29L 2031/7094 (2013.01); C08C 19/12 (2013.01)

(58) Field of Classification Search
CPC ............................... C08C 19/12; C08C 19/20
See application file for complete search history.

(56) References Cited

U.S. PATENT DOCUMENTS

| | | | | |
|---|---|---|---|---|
| 3,869,435 A | * | 3/1975 | Trivette, Jr. | .......... C07D 235/28 525/341 |
| 4,003,939 A | * | 1/1977 | Mueller | ................ C07C 327/22 560/302 |
| 4,730,025 A | * | 3/1988 | Bell | ........................ C08C 19/44 525/332.1 |
| 5,043,394 A | * | 8/1991 | Arsenault | ............... C08C 19/20 525/329.3 |
| 9,186,933 B2 | | 11/2015 | Nebhani | |
| 9,845,366 B2 | | 12/2017 | Kloppenburg et al. | |
| 2015/0252126 A1 | * | 9/2015 | Kloppenburg | .......... C08C 19/00 525/313 |

FOREIGN PATENT DOCUMENTS

| | | | | |
|---|---|---|---|---|
| CN | 103724541 A | | 4/2014 | |
| EP | 2676968 A1 | * | 12/2013 | ............. C08C 19/00 |
| JP | 62054739 A | * | 3/1987 | |
| JP | 4-218505 A | | 8/1992 | |
| TW | 201418298 A | | 5/2014 | |

* cited by examiner

Primary Examiner — Richard A Huhn
(74) Attorney, Agent, or Firm — Norris McLaughlin, P.A.

(57) ABSTRACT

Modified diene polymers containing heteroatoms are disclosed, as is their production, rubber mixtures comprising these modified diene rubbers, and to their use for the production of rubber vulcanizates, which serve, in particular, for the production of rubber moldings and the production of tires.

19 Claims, No Drawings

HETEROATOM CONTAINING MODIFIED DIENE POLYMERS

This application is a § 371 national stage of PCT International Application No. PCT/EP2016/050065, filed Jan. 5, 2016, which claims foreign priority benefit under 35 U.S.C. § 119 of European Patent Application No. 15154135.6, filed Feb. 6, 2015.

The present invention relates to modified diene polymers containing heteroatoms, production of these polymers, rubber mixtures comprising these modified diene rubbers, and to their use for the production of rubber vulcanizates, which serve, in particular, for the production of highly reinforced rubber moldings and in the production of tires.

Important properties desirable in tire treads include good adhesion on dry and wet surfaces, and high abrasion resistance. It is very difficult to improve the skid resistance of a tire without simultaneously worsening the rolling resistance and abrasion resistance. A low rolling resistance is important for low fuel consumption, and high abrasion resistance is a crucial factor for a long lifetime of the tire. Wet skid resistance and rolling resistance of a tire tread depend largely on the dynamic/mechanical properties of the rubbers used in the production. To lower the rolling resistance, rubbers with a high resilience at higher temperatures (60° C. to 100° C.) are used for the tire tread. On the other hand, for lowering the wet skid resistance, rubbers having a high damping factor at low temperatures (0° C. to 23° C.) or low resilience in the range of 0° C. to 23° C. are advantageous. In order to fulfill this complex profile of requirements, mixtures of various rubbers are used in the tread. Mixtures of one or more rubbers having a relatively high glass transition temperature, such as styrene-butadiene rubber, and one or more rubbers having a relatively low glass transition temperature, such as polybutadiene having a high 1,4-cis content or a styrene-butadiene rubber having a low styrene and low vinyl content or a polybutadiene prepared in solution and having a moderate 1,4-cis and low vinyl content, are used.

Methods exist for in-chain and terminal end chain functionalization of diene polymers. One method of end-group modification of polydienes uses doubly functionalized reagents. These use the polar functional group to react with the polydiene and, using a second polar functional group in the molecule, interact with the filler, as described by way of example in WO 01/34658 or U.S. Pat. No. 6,992,147. Methods for introducing functional groups at the start of polymer chains by means of functional anionic polymerization initiators are described, for example, in EP 0 513 217 B1 and EP 0 675 140 B1 (initiators with a protected hydroxyl group), US 2008/0308204 A1 (thioether-containing initiators) and in U.S. Pat. No. 5,792,820 and EP 0 590 490 B1 (alkali metal amides of secondary amines as polymerization initiators). More particularly, EP 0 594 107 B1 describes the in situ use of secondary amines as functional polymerization initiators, but does not describe the chain end functionalization of the polymers. In addition, numerous methods have been developed for introduction of functional groups at the end of polymer chains. For example, EP 0 180 141 A1 describes the use of 4,4'-bis(dimethylamino)benzophenone or N-methylcaprolactam as functionalization reagents. The use of ethylene oxide and N-vinylpyrrolidone is known from EP 0 864 606 A1. A number of further possible functionalization reagents are detailed in U.S. Pat. Nos. 4,906,706 and 4,417,029.

The terminal functionalization reagents used to date have considerable attendant disadvantages, including complicated production methods and instability due to their reactivity. In-chain functionalization processes are less often used. Functionalization reagents used for in-chain functionalization of rubbers include, for example, disulphur dichloride, leading to a Mooney jump, as described by way of example in WO 2013/189947 A1. The expression "step increase in Mooney viscosity" and similar expressions, for instance "Mooney jumped" or "Mooney jump", refer to techniques to significantly enhance the Mooney viscosity (ML 1+4 at 100° C.) of the polymers after the polymerization and/or the degree of branching. The polymer is typically modified with $S_2Cl_2$ in order to branch the polymer via sulphur bridge bonding in accordance with the following schematic reaction equation:

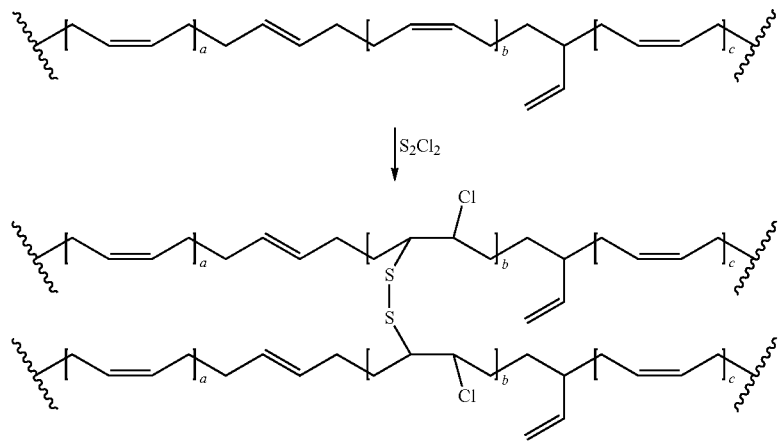

The degree of branching or the Mooney viscosity (ML 1+4 at 100° C.) is accordingly increased. The reaction scheme shown above describes, by way of example, the "Mooney jump" for a high-cis polybutadiene styrene copolymer. This reaction can also be performed on any other diene-containing polymers.

The modification typically utilizes sulphur halides, preferably disulphur dichloride, sulphur chloride, sulphur bromide, sulphur dichloride, thionyl chloride, disulphur dibromide or thionyl bromide. In order to avoid gel formation which may occur during the "Mooney Jump" reaction, an additional step is performed of treating the polymer, after the polymerization reaction, with a stopping agent, such as for instance with fatty acids. The "Mooney Jump" is limited to in-chain modifications with the incorporation of a sulphur atom bridge between polymeric chains, and a chlorine atom into the polymer chain, which allows for only a slight interaction between rubber and filler.

An object of the present invention is to provide a modified diene polymer and process for making the same which avoids the disadvantages of those used to date. Surprisingly, the abovementioned disadvantages of known polymers can now be avoided using the modified diene polymers containing heteroatoms according to the invention and the process for their making.

In accordance with the present invention, there is a modified polymer comprising an in-chain substructure according to formula (X)

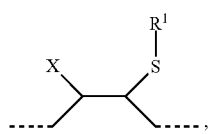
(X)

and/or a terminal end-chain substructure according to formula (XI),

—S—R$^1$       (XI)

where for formula (X),

X is a halogen, preferably, a halogen selected from the group of Cl, Br, and I, and for formulae (X) and (XI), R$^1$ is selected from a group of an aromatic amide moiety of the formula (II)

C$_6$(R$^2$)$_5$—(C=O)—N(R$^3$)—C$_6$(R$^2$)$_4$—       (II)

where R$^2$ and R$^3$ are identical or different and are a hydrogen moiety, a linear or branched alkyl moiety having from 1 to 16 C atoms, preferably from 1 to 8 C atoms, a phenyl moiety, or a cycloalkyl moiety having from 5 to 8 C atoms;

a dithiazyl disulphide moiety of the formula (III)

(III)

where R$^4$ are identical or different and are a hydrogen moiety, a halogen, nitro, hydroxy, a linear or branched alkyl moiety having from 1 to 12 C atoms, preferably from 1 to 8 C atoms, a linear or branched alkoxy moiety having from 1 to 12 C atoms, preferably from 1 to 8 C atoms, a phenyl moiety, a cycloalkyl moiety having from 5 to 8 C atoms, or together form the cyclic moiety of the formula (IV);

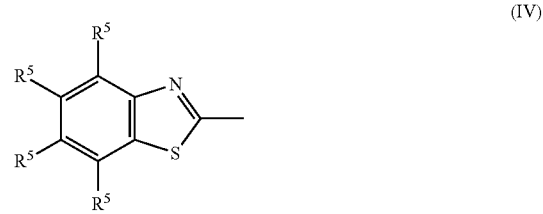
(IV)

where R$^5$ are identical or different and are a hydrogen moiety, hydroxy, a linear or branched alkyl moiety having from 1 to 12 C atoms, preferably from 1 to 8 C atoms, a linear or branched alkoxy moiety having from 1 to 12 C atoms, preferably from 1 to 8 C atoms, a phenyl moiety, or a cycloalkyl moiety having from 5 to 8 C atoms;

a bistrialkoxysilylalkyl polysulphide moiety of the formula (V)

(R$^6$O)$_3$Si—(CH$_2$)$_n$—(Y)$_m$—       (V)

where n is an integer from 1 to 12, preferably from 1 to 6;

m is an integer from 0 to 4, preferably from 0 to 2;

R$^6$ are identical or different and are a hydrogen atom, a linear or branched alkyl moiety having from 1 to 16 C atoms, preferably from 1 to 8 C atoms, a phenyl moiety, or a cycloalkyl moiety having from 5 to 8 C atoms;

Y is sulphur, a group of the formula (VIa), (VIb), (VIc), (VId), or (VIe)

—(S$_x$—CH$_2$—CH$_2$)$_n$—       (VIa)

—(S$_x$—CH$_2$—CH(OH)—CH$_2$)$_n$—       (VIb)

—(S$_x$—CH$_2$—CH$_2$OCH$_2$—CH$_2$)$_n$—       (VIc)

—(S$_x$—CH$_2$—(C$_6$H$_4$)—CH$_2$)$_n$—       (VId)

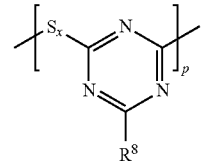
(VIe)

where x is an integer from 1 to 8, preferably from 2 to 6;

p is an integer from 1 to 12, preferably from 1 to 6;

R$^8$ are identical or different and are a hydrogen atom, a linear or branched alkyl moiety having from 1 to 16 C atoms, preferably from 1 to 8 C atoms, or an alkyl moiety having from 1 to 16 C atoms, preferably from 1 to 8 C atoms, a phenyl moiety, or a phenoxy moiety;

a thiuram moiety of the formula (VII)

(R$^9$)$_2$N—(C=Z)—       (VII)

where

Z is sulphur or oxygen,

R$^9$ are identical or different and are a hydrogen atom, a linear or branched alkyl moiety having from 1 to 16 C atoms, preferably from 1 to 8 C atoms, a phenyl moiety, or a cycloalkyl moiety having from 5 to 8 C atoms;

a dithioxanthogenate moiety according to the formula (VIII)

R$^{10}$—O—C(=S)—       (VIII)

where
R¹⁰ are identical or different and are a hydrogen atom, linear or branched alkyl moiety having from 1 to 16 C atoms, preferably from 1 to 8 C atoms, a phenyl moiety, or a cycloalkyl moiety having from 5 to 8 C atoms,
a phosphonate moiety according to the formula (IX)

where
Z is a sulphur or oxygen atom, R¹¹ are identical or different and are a hydrogen atom, a linear or branched alkyl moiety having from 1 to 16 C atoms, preferably from 1 to 8 C atoms, a phenyl moiety, or a cycloalkyl moiety having from 5 to 8 C atoms.

Further the modified polymer may also comprise a sulfur bridge between polymeric chains according to formula (XII)

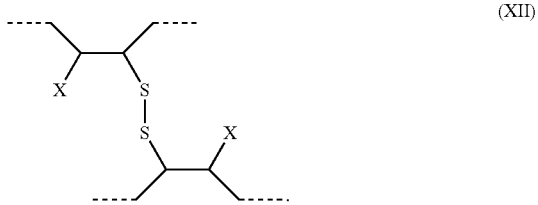

And where the modified polymer is a diene polymer or a diene copolymer obtained via copolymerization of at least one conjugated diene monomer or at least one conjugated diene monomer with at least one vinyl-aromatic co-monomer, for example, the polymer is preferably a polybutadiene or butadiene-styrene copolymer.

In another embodiment of the present invention there is a process for producing a modified polymer, as well as the modified polymer obtained according to the process, comprising the steps of reacting a diene polymer with a halogenated sulphidic organic compound, wherein the halogenated sulphidic organic compound is formed by reacting a halogen with a sulphidic compound with the general formula (I-a) and/or (I-b) and/or (I-c):

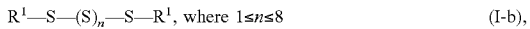

where R¹ are identical or different and selected from a group of
an aromatic amide moiety of the formula (II)

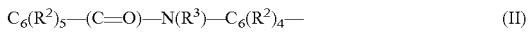

where R² and R³ are identical or different and are a hydrogen moiety, a linear or branched alkyl moiety having from 1 to 16 C atoms, preferably from 1 to 8 C atoms, a phenyl moiety, or a cycloalkyl moiety having from 5 to 8 C atoms;
dithiazyl disulphides of the formula (IV)

where R⁴ are identical or different and are a hydrogen moiety, a halogen, nitro, hydroxy, a linear or branched alkyl moiety having from 1 to 12 C atoms, preferably from 1 to 8 C atoms, a linear or branched alkoxy moiety having from 1 to 12 C atoms, preferably from 1 to 8 C atoms, a phenyl moiety, a cycloalkyl moiety having from 5 to 8 C atoms, or together form the cyclic moiety of the formula (IV);

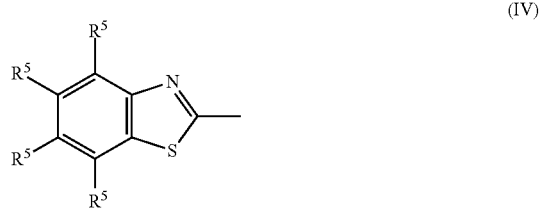

where R⁵ are identical or different and are a hydrogen moiety, hydroxy, a linear or branched alkyl moiety having from 1 to 12 C atoms, preferably from 1 to 8 C atoms, a linear or branched alkoxy moiety having from 1 to 12 C atoms, preferably from 1 to 8 C atoms, a phenyl moiety, or a cycloalkyl moiety having from 5 to 8 C atoms;
a bistrialkoxysilylalkyl polysulphide moiety of the formula (V)

where
n is an integer from 1 to 12, preferably from 1 to 6;
m is an integer from 0 to 4, preferably from 0 to 2;
R⁶ are identical or different and are a hydrogen atom, a linear or branched alkyl moiety having from 1 to 16 C atoms, preferably from 1 to 8 C atoms, a phenyl moiety, or a cycloalkyl moiety having from 5 to 8 C atoms;
Y is sulphur, a group of the formula (VIa), (VIb), (VIc), (VId), or (VIe)

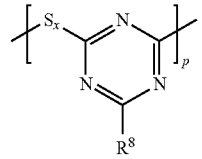

where
x is an integer from 1 to 8, preferably from 2 to 6;
p is an integer from 1 to 12, preferably from 1 to 6;
R⁸ are identical or different and are a hydrogen atom, a linear or branched alkyl moiety having from 1 to 16 C atoms, preferably from 1 to 8 C atoms, or an alkyl moiety having from 1 to 16 C atoms, preferably from 1 to 8 C atoms, a phenyl moiety, or a phenoxy moiety;
a thiuram moiety of the formula (VII)

where
Z is sulphur or oxygen,
R⁹ are identical or different and are a hydrogen atom, a linear or branched alkyl moiety having from 1 to 16 C atoms, preferably from 1 to 8 C atoms, a phenyl moiety, or a cycloalkyl moiety having from 5 to 8 C atoms;
a dithioxanthogenate moiety according to the formula (VIII)

$$R^{10}-O-C(=S)- \quad (VIII)$$

where
$R^{10}$ are identical or different and are a hydrogen atom, linear or branched alkyl moiety having from 1 to 16 C atoms, preferably from 1 to 8 C atoms, a phenyl moiety, or a cycloalkyl moiety having from 5 to 8 C atoms,
a phosphonate moiety according to the formula (IX)

$$(R^{11}-O)(R^{11}-O)P(Z)- \quad (IX)$$

where
Z is a sulphur or oxygen atom,
$R^{11}$ are identical or different and are a hydrogen atom, a linear or branched alkyl moiety having from 1 to 16 C atoms, preferably from 1 to 8 C atoms, a phenyl moiety, or a cycloalkyl moiety having from 5 to 8 C atoms.

The process can comprise in another embodiment, reacting the diene polymer with a moony jump functionalization reagent, for example, where such reagent is a sulphur halide, preferably disulphur dichloride, sulphur chloride, sulphur bromide, sulphur dichloride, thionyl chloride, disulphur dibromide or thionyl bromide. In order to avoid gel formation which may result during the "Mooney Jump" reaction, there is performed an additional step of treating the polymer, after the polymerization reaction, with one or more fatty acids.

In another embodiment of the invention, there is a rubber mixture comprising a modified rubber as provided above and one or more of a rubber auxiliary and/or at least one further rubber different from the rubber of the modified polymer. Rubber auxiliaries generally improve the processing properties of the rubber compositions, or serve for the crosslinking of the rubber compositions, or improve the physical properties of the vulcanizates produced from the rubber compositions of the invention for the specific intended use of the vulcanizates, or improve the interaction between rubber and filler or serve to couple the rubber to the filler. Examples of rubber auxiliaries are crosslinking agents, e.g. sulphur or sulphur-donor compounds, and also reaction accelerators, antioxidants, heat stabilizers, light stabilizers, antiozone agents, processing aids, plasticizers, tackifiers, blowing agents, dyes, pigments, waxes, extenders, organic acids, silanes, retarders, metal oxides, extender oils, e.g. DAE (Distillate Aromatic Extract) oil, TDAE (Treated Distillate Aromatic Extract) oil, MES (Mild Extraction Solvate) oil, RAE (Residual Aromatic Extract) oil, TRAE (Treated Residual Aromatic Extract) oil, and naphthenic and heavy naphthenic oils, and also activators.

In another embodiment, there is a rubber mixture comprising the modified polymer above and from 10 to 500 parts by weight of filler, based on 100 parts by weight of the modified polymer.

The diene polymer of the inventive modified polymer is prepared via polymerization reaction, preferably, either anionic solution polymerization or polymerization by means of coordination catalysts.

Conjugated diene monomers that can be used are any known dienes conventionally used for the production. Examples that may be mentioned are: 1,3-butadiene, 2,3-dimethyl-1,3-butadiene, 3-butyl-1,3-octadiene, isoprene, piperylene, 1,3-hexadiene, 1,3-octadiene, 2-phenyl-1,3-butadiene, preferably 1,3-butadiene and isoprene, and also mixtures of the same. In one embodiment there is used 1,3-butadiene.

Examples of vinylaromatic monomers that can be used are styrene, o-, m- and/or p-methylstyrene, p-tert-butylstyrene, α-methylstyrene, vinylnaphthalene, divinylbenzene, trivinylbenzene and/or divinylnaphthalene. In one embodiment there is used styrene.

In another embodiment of invention, the diene polymer is styrene butadiene copolymer.

In another embodiment of the invention, the content of copolymerised vinylaromatic monomers in the modified diene polymer is from 0 to 60% by weight, preferably from 15 to 45% by weight, and their content of dienes is from 40 to 100% by weight, preferably from 55 to 85% by weight, where the content of 1,2-bonded dienes (vinyl content) in the dienes is from 0.5 to 95% by weight, preferably from 10 to 85% by weight, and the entirety composed of copolymerized vinylaromatic monomers and dienes gives a total of 100%.

Initiators for anionic solution polymerization reactions are those based on alkali metal or on alkaline earth metal, an example being n-butyllithium. It is also possible to use the known randomizers and control agents for the microstructure of the polymer, examples being potassium tert-amyl alcoholate, sodium tert-amyl alcoholate and tert-butoxyethoxyethane. Solution polymerization reactions of this type are known and are described by way of example in I. Franta, Elastomers and Rubber Compounding Materials, Elsevier 1989, pages 113-131, and in Comprehensive Polymer Science, Vol. 4, Part II (Pergamon Press Ltd., Oxford 1989), pages 53-108.

Catalysts used for polymerization by means of coordination catalysts are preferably compounds of the rare-earth metals, as, by way of example, described in EP-B-011184 or EP-A 1245600. It is also possible to use any of the Ziegler-Natta catalysts known for the polymerization reaction, for example, those based on titanium, cobalt, vanadium or nickel compounds, or else based on compounds of the rare-earth metals. The Ziegler-Natta catalysts mentioned can be used either individually or else in a mixture with one another.

It is preferable to use Ziegler-Natta catalysts based on compounds of the rare-earth metals, for example cerium, lanthanum, praseodymium, gadolinium or neodymium compounds, where these are soluble in hydrocarbons. It is particularly preferable to use, as Ziegler-Natta catalysts, the corresponding salts of the rare-earth metals, for example neodymium carboxylates, in particular neodymium neodecanoate, neodymium octanoate, neodymium naphthenate, neodymium 2,2-diethylhexanoate or neodymium 2,2-diethylheptanoate, or else the corresponding salts of lanthanum or of praseodymium. The Ziegler-Natta catalysts that can be used moreover also comprise catalyst systems based on metallocenes, e.g. as described in EP-A 1025136 and EP-A 1078939.

The polymerization reaction can take place by conventional processes in one or more stages and, respectively, batchwise or continuously. Preference is given to the continuous procedure in a reactor cascade composed of a plurality of reactors connected in series, preferably at least 2, in particular from 2 to 5.

The polymerization reaction can be carried out in a solvent. Preference is given to inert aprotic solvents, e.g. paraffinic hydrocarbons, such as isomeric pentanes, hexanes, heptanes, octanes, decanes, 2,4-trimethylpentane, cyclopentane, cyclohexane, methylcyclohexane, ethylcyclohexane or 1,4-dimethylcyclohexane, or aromatic hydrocarbons, such as benzene, toluene, ethylbenzene, xylene, diethylbenzene or propylbenzene. These solvents can be used individually or in combination. Preference is given to cyclohexane and n-hexane. Blending with polar solvents is likewise possible. The polymerization reaction is preferably carried out in the presence of the abovementioned inert aprotic solvents, optionally blended with polar solvents. The quantity of solvent for the process of the invention is usually from 1000 to 100 g, preferably from 500 to 150 g, based on 100 g of the entire quantity of monomer used. It is also possible, of course, that the monomers used are polymerized in the absence of solvents.

The polymerization temperature can vary widely and is generally in the range from 0° C. to 200° C., preferably from 40° C. to 130° C. The reaction time likewise varies widely from a number of minutes up to a number of hours. The polymerization reaction is usually carried out within a period of about 30 minutes up to 8 hours, preferably 1 to 4 hours. It can be carried out either at atmospheric pressure or at elevated pressure (from 1 to 10 bar).

The polymerization of the unsaturated monomers can preferably be carried out to full conversion of the monomers used. It is also possible to interrupt the polymerization reaction prematurely as required by the desired properties of the modified polymer, for example at about 80% conversion of the monomers. After the polymerization reaction, the unconverted diene can, if so desired, be removed, such as by distillation under reduced pressure, for example a flash stage.

In another step of the process, halogenated sulphidic organic compounds or, respectively, a mixture of such compounds, for use in the modification reaction are formed from a halogenation reaction of a sulphidic compound (referred herein also as sulphidic organic compounds) with the general formula (I-a) and/or (I-b) and/or (I-c):

$$R^1-S-S-R^1 \tag{I-a},$$

$$R^1-S-(S)_n-S-R^1, \text{ where } 1 \leq n \leq 8 \tag{I-b},$$

$$R^1-SH \tag{I-c},$$

where
$R^1$ are identical or different and selected from a group of an aromatic amide moiety of the formula (II)

$$C_6(R^2)_5-(C=O)-N(R^3)-C_6(R^2)_4- \tag{II}$$

where $R^2$ and $R^3$ are identical or different and are a hydrogen moiety, a linear or branched alkyl moiety having from 1 to 16 C atoms, preferably from 1 to 8 C atoms, a phenyl moiety, or a cycloalkyl moiety having from 5 to 8 C atoms;
a dithiazyl disulphide moiety of the formula (III)

where $R^4$ are identical or different and are a hydrogen moiety, a halogen, nitro, hydroxy, a linear or branched alkyl moiety having from 1 to 12 C atoms, preferably from 1 to 8 C atoms, a linear or branched alkoxy moiety having from 1 to 12 C atoms, preferably from 1 to 8 C atoms, a phenyl moiety, a cycloalkyl moiety having from 5 to 8 C atoms, or together form the cyclic moiety of the formula (IV);

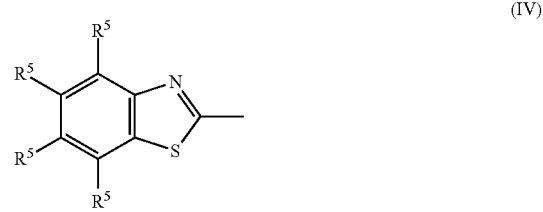

where $R^5$ are identical or different and are a hydrogen moiety, hydroxy, a linear or branched alkyl moiety having from 1 to 12 C atoms, preferably from 1 to 8 C atoms, a linear or branched alkoxy moiety having from 1 to 12 C atoms, preferably from 1 to 8 C atoms, a phenyl moiety, or a cycloalkyl moiety having from 5 to 8 C atoms;
a bistrialkoxysilylalkyl polysulphide moiety of the formula (V)

$$(R^6O)_3Si-(CH_2)_n-(Y)_m- \tag{V}$$

where
n is an integer from 1 to 12, preferably from 1 to 6;
m is an integer from 0 to 4, preferably from 0 to 2;
$R^6$ are identical or different and are a hydrogen atom, a linear or branched alkyl moiety having from 1 to 16 C atoms, preferably from 1 to 8 C atoms, a phenyl moiety, or a cycloalkyl moiety having from 5 to 8 C atoms;
Y is sulphur, a group of the formula (VIa), (VIb), (VIc), (VId), or (VIe)

$$-(S_x-CH_2-CH_2)_n- \tag{VIa}$$

$$-(S_x-CH_2-CH(OH)-CH_2)_n- \tag{VIb}$$

$$-(S_x-CH_2-CH_2OCH_2-CH_2)_n- \tag{VIc}$$

$$-(S_x-CH_2-(C_6H_4)-CH_2)_n- \tag{VId}$$

where
x is an integer from 1 to 8, preferably from 2 to 6;
p is an integer from 1 to 12, preferably from 1 to 6;
$R^8$ are identical or different and are a hydrogen atom, a linear or branched alkyl moiety having from 1 to 16 C atoms, preferably from 1 to 8 C atoms, or an alkyl moiety having from 1 to 16 C atoms, preferably from 1 to 8 C atoms, a phenyl moiety, or a phenoxy moiety;
a thiuram moiety of the formula (VII)

$$(R^9)_2N-(C=Z) \tag{VII}$$

where
Z is sulphur or oxygen,
$R^9$ are identical or different and are a hydrogen atom, a linear or branched alkyl moiety having from 1 to 16 C atoms, preferably from 1 to 8 C atoms, a phenyl moiety, or a cycloalkyl moiety having from 5 to 8 C atoms;
a dithioxanthogenate moiety according to the formula (VIII)

where
$R^{10}$ are identical or different and are a hydrogen atom, linear or branched alkyl moiety having from 1 to 16 C atoms, preferably from 1 to 8 C atoms, a phenyl moiety, or a cycloalkyl moiety having from 5 to 8 C atoms,
a phosphonate moiety according to the formula (IX)

where
Z is a sulphur or oxygen atom,
$R^1$ are identical or different and are a hydrogen atom, a linear or branched alkyl moiety having from 1 to 16 C atoms, preferably from 1 to 8 C atoms, a phenyl moiety, or a cycloalkyl moiety having from 5 to 8 C atoms.

Among the group of the sulphidic organic compounds to be halogenated are by way of example disulphide compounds such as di(benzothiazol-2-yl) disulphide (Vulkacit® DM/C) or tetrabenzylthiuram disulphide (Perkacit® TBzTD) or polysulphide compounds such as di(di-(2-ethylhexyl) thiophosphonate) polysulphide (Rhenocure® SDT/S).

The halogenation reaction of the sulphidic organic compounds can be carried out using various known halogens, including without limitation, chlorine, bromine, iodine, or other chlorination agents known to those skilled in the art, such as carbon tetrachloride, N-chlorosuccimide, cyanuric chloride, phosphorous oxychloride, phosphorus pentachloride, phosphorus trichloride, sulfuryl chloride, thionyl chloride, sulfur chlorides such as $S_2Cl_2$.

The halogenation reaction can be performed with from 0.05 to 10 equivalents of halogen, preferably with from 0.5 to 5 equivalents of halogen, preferably with from 0.7 to 2.1 equivalents of halogen, based on the sulphidic organic compounds. The reaction solvent can be any non-protic solvent such as n-hexane, iso-hexanes, cyclohexanes or mixtures thereof, any other alkanes, aromatics such as benzene, toluene or xylenes, ethers such as diethylether or methyl-t-butyl ether. The solvents mentioned are examples and are not restrictive. In one embodiment, the solvent of the halogenation reaction is chosen to be the same as that of the polymerization reaction.

The halogenation reaction may be performed at temperatures between 0° C. and 100° C. but is not restricted to these temperatures. In one embodiment, the temperature is chosen to be about the same as that of the polymerization reaction.

In another step, the modification reaction according to the invention is performed where the halogenated sulphidic organic compounds and the polymerization mixture obtained during the polymerization reaction are mixed and reacted with one another.

Per the modification reaction, a modified polymer is formed having an in-chain substructure according to formula (X)

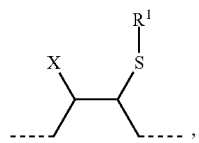

and/or
a terminal end-chain substructure according to formula (XI),

where
for formula (X), X is a halogen, preferably, a halogen selected from the group of Cl, Br, and I, and
for formulae (X) and (XI),
$R^1$ is as previously defined above.

The quantity used of the halogenated sulphidic organic compounds depends on the desired degree of modification of the polymeric material. It is preferable that the ratio of sulphidic organic compounds to polymer is in the range from 0.05 to 10 phr, in particular from 0.25 to 5 phr, where 1 phr corresponds to one gram of substance, based on 100 grams of polymer.

In the modification reaction it is advantageous that no disruptive compounds which could adversely affect the modification reaction are present. Examples of disruptive compounds of this type are carbon dioxide, oxygen, water, alcohols, and organic and inorganic acids.

The modification reaction may be carried out at temperatures which approximately correspond to the temperatures of the polymerization reaction. This means that the modification reaction is carried out at temperatures of about 0° C. to 200° C., preferably 40° C. to 130° C. The modification reaction can likewise be carried out at atmospheric pressure or at elevated pressure (from 1 to 10 bar).

The modification reaction time can vary widely. In one embodiment, the time is in the range from about 1 minute to about 1 hour.

The modified polymers resulting from the modification reaction, in one embodiment, are obtained by treating the reaction mixture with terminator reagents which comprise active hydrogen, for example alcohols or water or appropriate mixtures. It is advantageous to add antioxidants to the reaction mixture before the modified polymer is isolated. The modified polymer is isolated conventionally, for example by steam distillation or flocculation with a suitable flocculating agent, for example alcohols. The flocculated polymer is then by way of example removed from the resultant medium by centrifuging or extrusion. Residual solvent and other volatile constituents can be removed from the isolated polymer by heating, optionally under reduced pressure or in an airstream produced by a blower.

The molecular weight of the polymers modified according to the invention can vary widely. In one embodiment, the number-average molecular weight of the modified polymer is in the range from about 1000 to about 2,000,000. The content of 1,2-bonds (vinyl content) is preferably from 0.3 to 1% by weight.

The modification reaction may further comprise a Mooney jump to the polymer. The Mooney jump may utilize, as moony jump reagent, sulphur halides, preferably disulphur dichloride, sulphur chloride, sulphur bromide, sulphur dichloride, thionyl chloride, disulphur dibromide or thionyl bromide. In order to avoid gel formation during the Mooney Jump reaction, there is performed an additional step of treating the polymer, after the polymerization reaction, with one or more fatty acids. In one embodiment, the modified polymer is Mooney jumped via reaction with $S_2Cl_2$, whereby the Mooney viscosity of the modified polymer is increased over the polymer without such an addition. Per a Mooney jump a Mooney jumped modified polymer is obtained having a sulfur bridge substructure between polymeric chains, according to formula (XII)

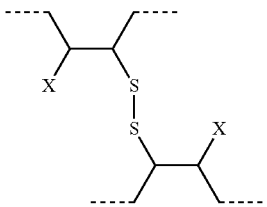

(XII)

and further comprising an in-chain substructure according to formula (X)

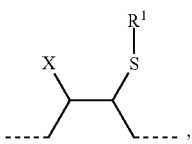

(X)

and/or
a terminal end-chain substructure according to formula (XI), $$-S-R^1 \quad (XI)$$

wherein
for formulae (XII) and (X),
X is a halogen, preferably, a halogen selected from the group of Cl, Br, and I, and
for formulae (X) and (XI),
$R^1$ is as previously defined above.

It should also be appreciated, it is possible in another embodiment of the invention, to perform the modification reaction (i.e., the reaction between the polymers and the halogenated sulphidic organic compounds) directly after the polymerization without any need for isolation or other work-up of the reactants, as well as optionally further performing a Mooney jump directly without any need for isolation or other work-up of the modified polymers. Thus, the present invention further provides a process for the production of the modified polymers of the invention where conjugated diene monomers are polymerized in the presence of inert organic, aprotic solvents (polymer solution), and the polymers resulting from the polymerization reaction are reacted with halogenated sulfphidic organic compounds which are added directly to the polymer solution. And, in another embodiment, the modified polymers resulting from the modification reaction are Mooney jump reacted with functionalization reagents, for example disulphur dichloride, which are likewise added directly to the polymer solution.

The quantity of halogenated sulfidic compounds to be used can vary widely. In one embodiment there is used about 0.05 phr to 10 phr by weight per 100 parts by weight of all of the monomers used for the polymerization reaction.

The quantity of Mooney jump functionalization reagent to be used can vary widely. In one embodiment there is used about 0.01 phr to 2 phr, preferably 0.04 to 1 phr, by weight per 100 parts by weight of all of the monomers used for the polymerization reaction.

The modified polymers of the invention can be used for the production of rubber mixtures, in turn used for the production of vulcanizates, especially for the production of tires, especially tire treads, having particularly low rolling resistance coupled with high wet skid resistance and abrasion resistance, or layers thereof, or rubber moldings. Such rubber mixtures preferably comprise rubber auxiliaries (examples being compounding components, fillers, dye, pigments, softeners, rubber chemicals, processing aids, extender oils, and reinforcing agents), and/or one or more further rubbers. Vulcanizable compositions comprising such rubber mixtures preferably further comprise at least one cross-linking system, comprising as least one cross-linker and optionally one or more crosslinking accelerators, or vulcanization reagents.

The vulcanizable rubber compositions can be produced in a one-stage or in a multistage process, preference being given to 2 to 3 mixing stages. For example, sulphur and accelerator can be added in a separate mixing stage, for example on a roller, preferred temperatures being in the range from 30 to 90° C. In one embodiment there is a process for producing vulcanizates, comprising vulcanizing the vulcanizable composition, preferably in the course of a shaping process, preferably at a temperature in the range from 100° C. to 200° C., more preferably from 120° C. to 190° C. and especially preferably from 130° C. to 180° C.

Preference is given to adding sulphur and accelerator in the last mixing stage. Examples of equipment suitable for the production of the vulcanizable rubber compositions include rollers, kneaders, internal mixtures or mixing extruders. Thus, the invention further provides vulcanizable rubber compositions comprising the modified polymers.

The inventive vulcanizable rubber compositions are also suitable for production of mouldings, for example for the production of cable sheaths, hoses, drive belts, conveyor belts, roll covers, shoe soles, gasket rings and damping elements. Additional rubbers are, for example, natural rubber and synthetic rubbers. If present, the amount thereof is preferably within the range from 0.5 to 95%, preferably 10 to 80%, by weight, based on the total amount of polymer in the mixture. The amount of rubbers additionally added is again guided by the respective end use of the inventive mixtures.

Synthetic rubbers known from the literature are listed here by way of example. They comprise, inter alia, BR—polybutadiene
ABR—butadiene/$C_1$-$C_4$-alkyl acrylate copolymers
IR—polyisoprene
E-SBR styrene-butadiene copolymers having styrene contents of 1-60%, preferably 20-50%, by weight, prepared by emulsion polymerization
S-SBR styrene-butadiene copolymers having styrene contents of 1-60%, preferably 15-45%, by weight, prepared by solution polymerization
IIR—isobutylene-isoprene copolymers
NBR—butadiene-acrylonitrile copolymers having acrylonitrile contents of 5-60%, preferably 10-40%, by weight
HNBR partly hydrogenated or fully hydrogenated NBR rubber
EPDM ethylene-propylene-diene terpolymers
and mixtures of the aforementioned rubbers. For the production of car tires, particularly natural rubber, E-SBR and S-SBR having a glass transition temperature above −60° C., polybutadiene rubber which has a high cis content (>90%) and has been prepared with catalysts based on Ni, Co, Ti or Nd, and polybutadiene rubber having a vinyl content of up to 80% and mixtures thereof are of interest.

Useful fillers for the vulcanizable rubber compositions include all known fillers used in the rubber industry. These include both active and inactive fillers.

The following should be mentioned by way of example: finely divided silicas, produced, for example, by precipitation of solutions of silicates or flame hydrolysis of silicon halides having specific surface areas of 5-1000, preferably 20-400, m²/g (BET surface area) and having primary particle sizes of 10-400 nm. The silicas may optionally also be present as mixed oxides with other metal oxides, such as oxides of Al, Mg, Ca, Ba, Zn, Zr, Ti;

synthetic silicates, such as aluminium silicate, alkaline earth metal silicates such as magnesium silicate or calcium silicate, having BET surface areas of 20-400 m²/g and primary particle diameters of 10-400 nm;

natural silicates, such as kaolin and other naturally occurring silica;

glass fibres and glass fibre products (mats, strands) or glass microspheres;

metal oxides, such as zinc oxide, calcium oxide, magnesium oxide, aluminium oxide;

metal carbonates, such as magnesium carbonate, calcium carbonate, zinc carbonate;

metal hydroxides, for example aluminium hydroxide, magnesium hydroxide;

metal sulphates, such as calcium sulphate, barium sulphate; carbon blacks: The carbon blacks to be used here are carbon blacks produced by the lamp black, channel black, furnace black, gas black, thermal black, acetylene black or light arc process and have BET surface areas of 9-200 m²/g, for example SAF, ISAF-LS, ISAF-HM, ISAF-LM, ISAF-HS, CF, SCF, HAF-LS, HAF, HAF-HS, FF-HS, SPF, XCF, FEF-LS, FEF, FEF-HS, GPF-HS, GPF, APF, SRF-LS, SRF-LM, SRF-HS, SRF-HM and MT carbon blacks, or ASTM N110, N219, N220, N231, N234, N242, N294, N326, N327, N330, N332, N339, N347, N351, N356, N358, N375, N472, N539, N550, N568, N650, N660, N754, N762, N765, N774, N787 and N990 carbon blacks; and/or rubber gels, especially those based on BR, E-SBR and/or polychloroprene having particle sizes of 5 to 1000 nm.

The fillers used are preferably finely divided silicas and/or carbon blacks.

The fillers mentioned can be used alone or in a mixture. In one preferred embodiment, the vulcanizable rubber compositions comprise, as fillers, a mixture of light-coloured fillers, such as finely divided silicas, and carbon blacks, the mixing ratio of light-coloured fillers to carbon blacks being 0.01:1 to 50:1, preferably 0.05:1 to 20:1.

The fillers are used here in amounts in the range from 10 to 500 parts by weight based on 100 parts by weight of rubber. Preference is given to using 20 to 200 parts by weight.

The invention further provides the use of the modified polymers of the invention for the production of tires and tire components, golf balls and technical rubber items, and also rubber-reinforced plastics, e.g. ABS plastics and HIPS plastics. When the modified polymers of the invention are used in vulcanizable rubber compositions for tire production, it is possible, inter alia, to discern a marked decrease of the loss factors tan delta in dynamic damping and amplitude sweep, and also an increase of the rebound at 23° C. and 60° C., and also an increase of hardness and of the moduli in the tensile test.

Although the preferred embodiment of the present invention has been described herein with reference to the accompanying drawings, it is to be understood that the invention is not limited to that precise embodiment, and that various other changes and modifications may be affected therein by one skilled in the art without departing from the scope or spirit of the invention. The examples below serve to illustrate the invention, without any associated limiting effect.

EXAMPLES

I. Polymers

Inventive Example 1

Preparation of Fx-PBR1

Preparation of the modification reagent #1: Perkacit® TBzTD (109 g) was dispersed in dry hexane (330 g) at 50° C. Chlorine gas (17 g) is introduced. The reaction mixture was stirred for 30 min at 50° C. This gave a clear, yellow solution. The quantity needed for functionalization was then charged directly from this solution to a polymerization reactor with the below living polymer cement.

71.4 kg of an 18.2% living polymer solution ("cement") are charged under inert conditions of dry nitrogen into a 160 L steal reactor, that is equipped with an agitator, temperature control and a burette. To control the cement Mooney viscosity, about 300 g of the cement was transferred under nitrogen to a 1 L bottle, short stopped with 100 g of ethanol, stabilized with 0.2 g Irganox® 1520 and dried at 100° C. on a hot mill to get a solid sample. The resulting cement Mooney viscosity (ML 1+4@ 100° C.) was found to be 42.4 MU.

243 g of the modification reagent #1 was placed in the burette and added under mixing at 58° C. to the reactor. The reaction mixture is stirred for 30 min. The mixture is then stabilized with 0.2 phr of Irganox® 1520. The polymer solution is stripped (pH 8-9), and the rubber is dried in dried in vacuo at 65° C. for 48 hours to a residual moisture level of <0.5% and found to have the following analytic data: Mooney viscosity (ML 1+4@ 100° C.): 52.5 MU, Mooney Stress Relaxation MSR 0.58; Solution viscosity 200 mPas; and Microstructure by FT-IR: 1,4-cis-BR: 97.7%, 1,4-trans-BR: 1.8%, 1.2-vinyl-BR: 0.5%.

Inventive Example 2

Preparation of Fx-PBR2

Preparation of the modification reagent #2: Vulkacit® DM (50 g) was dispersed in cyclohexane (400 g) at 50° C. Chlorine gas (12.8 g) was introduced and the reaction mixture was stirred for 30 min at 50° C. This gave a clear solution. The quantity needed for functionalization was charged directly from this solution to a polymerization reactor with living polymer cement below.

68.1 kg of an 18.2% living polymer solution cement were charged into a reactor in a manner analogous to example 1. The cement Mooney viscosity (ML 1+4@ 100° C.) was 46.4 MU. 462 g of the modification reagent #2 was added at 63° C. thereto, and the reaction mixture stirred for 30 min. The mixture was then stabilized with 0.2 phr of Irganox® 1520. The polymer solution was stripped (pH 8-9), and the rubber was dried in vacuo at 65° C. for 48 hours to a residual moisture level of <0.5% and found to have the following analytic data:

Mooney viscosity (ML 1+4@ 100° C.): 43.5 MU, Mooney Stress Relaxation MSR 0.75; Solution viscosity 184 mPas; Microstructure by FT-IR: 1,4-cis-BR: 97.7%, 1,4-trans-BR: 1.8%, 1.2-vinyl-BR: 0.5%.

Reference Example 3

71.4 kg of an 18.2% living polymer solution cement are charged into a reactor in a manner analogous to example 1 and short stopped by the addition of 300 g iso-propanol. The reactor was stirred for 1 hour. The cement Mooney viscosity (ML 1+4@ 100° C.) was 33.0 MU. 3.9 g lauric acid dissolved in 100 g of hexane were added and the reactor was stirred for 30 minutes. 26 g of S$_2$Cl$_2$ were added at 60° C. thereto, and the reaction mixture was stirred again for 30 min. The mixture was then stabilized with the addition of 0.2 phr of Irganox® 1520. The polymer solution was stripped (pH 8-9), and the rubber dried in vacuo at 65° C. for 48 hours to a residual moisture level of <0.5% and found to have the following analytic data:

Mooney viscosity (ML 1+4@ 100° C.): 43.2 MU, Mooney Stress Relaxation MSR 0.55; Solution viscosity 157 mPas.

Inventive Example 4

Preparation of Moony Jumped Fx-PBR2

1 kg of the functionalized NdBR of example 2 (Fx-PBR2) was dissolved in 9 kg of hexane under inert atmosphere. 0.20 phr of lauric acid was added and the reaction mixture was heated to 65° C. 3 g of S$_2$Cl$_2$ were slowly added and the reaction mixture was stirred for 30 minutes. The reaction was cooled to ambient temperature and a mixture of 0.5 phr of epoxidized soja beanoil (ESBO) and 0.5 phr of Vulkanox® 4020 were added. The procedure was repeated a second time and both solutions were finished together. The product was precipitated in 60 L of ethanol and was dried in vacuo at 65° C. for 48 hours to a residual moisture level of <0.5% and found to have the following analytic data:

Mooney viscosity (ML 1+4@ 100° C.): 65.7 MU, Mooney Stress Relaxation MSR 0.42.

II: Vulcanizate Tests

The following properties were determined on the vulcanizates in accordance with the stated standards:
DIN 53505: Shore A hardness at 60° C.
DIN 53512: rebound resilience at 60° C.
DIN 53504: tensile test with stress values at 100% and 300% (S100 and S300)
DIN 53513: dynamic damping via Eplexor equipment—Eplexor equipment (Eplexor 500 N) from Gabo-Testanlagen GmbH, Ahlden, Germany was used to determine dynamic properties (temperature dependency of storage modulus E' in the temperature range from −60° C. to 0° C. and also tan δ at 60° C.). The values were determined in accordance with DIN53513 at 10 Hz on Ares strips in the temperature range from −100° C. to +100° C. at a heating rate of 1 K/min.
The method was used to obtain the following variables, the terminology here being in accordance with ASTM 5992-96:
tan δ (60° C.): loss factor (E''/E') at 60° C.
tan δ (60° C.) is a measure of hysteresis loss from the tyre under operating conditions. As tan δ (60° C.) decreases, the rolling resistance of the tyre decreases.
DIN53513-1990: Elastic properties—An MTS elastomer test system (MTS Flex Test) from MTS was used to determine the elastic properties. The measurements were carried out in accordance with DIN53513-1990 on cylindrical samples (2 samples each 20×6 mm) with a total 2 mm compression at a temperature of 60° C. and a measurement frequency of 1 Hz in the range of amplitude sweep from 0.1 to 40%.
The method was used to obtain the following variables, the terminology here being in accordance with ASTM 5992-96:
G* (15%): dynamic modulus at 15% amplitude sweep
tan δ (max): maximum loss factor (G''/G') of entire measuring range at 60° C.
tan δ (max) is a measure of the hysteresis loss from the tire under operating conditions. As tan δ (max) decreases, the rolling resistance of the tire decreases.

Comparison of polymer Mooney of various modified NdBRs according to the invention and standard NdBRs

|  | Polymer ML (1 + 4)$_{100°\ C.}$ [MU] | MSR [MU s$^{-1}$] |
| --- | --- | --- |
| Fx-PBR 1 (Inventive Example 1) | 52.5 | 0.58 |
| Fx-PBR 2 (Inventive Example 2) | 43.5 | 0.75 |
| Buna ® CB24 (Reference) | 43.7 | 0.62 |
| Reference Example 3 | 43.6 | 0.59 |
| Example 4 (Ex 2 + Mooney Jump) (Inventive) | 65.7 | 0.42 |

Following substances were used in the compounds:

| Tradename | Producer |
| --- | --- |
| BUNA ® CB 24 (Nd-Polybutadiene) | Lanxess Deutschland GmbH |
| CORAX ® N 326 (Carbon Black) | Evonic Degussa GmbH |
| VIVATEC ® 500 (oil) | Hansen und Rosenthal KG |
| ROTSIEGEL ® ZINC WHITE (Zinc oxide) | Grillo Zinkoxid GmbH |
| EDENOR ® C 18 98-100 (stearic acid) | Caldic Deutschland GmbH |
| VULKANOX ® 4020/LG (Stabilizer) | Lanxess Deutschland GmbH |
| VULKANOX ® HS/LG (Stabilizer) | Lanxess Deutschland GmbH |
| VULKACIT ® CZ/EGC (Accelerator) | Lanxess Deutschland GmbH |
| RHENOGRAN ® IS 90-65 (Sulfur) | RheinChemie Rheinau GmbH |
| TSR/RSS 3 DEFO 700 (Natural rubber) | Natural Rubber Defo 700 |

All quantities mentioned below are provided in phr (parts per hundred) of rubber. The following substances were used for the mixture studies on modified NdBR (Fx-PBR1 and 2), on reference example 3 and on standard NdBR Buna® CB 24 with Carbon Black:

| | |
| --- | --- |
| BR Rubber | 100 |
| CORAX ® N 326 | 50 |
| VIVATEC ® 500 | 4 |
| EDENOR ® C 18 98-100 | 3 |
| VULKANOX ® 4020/LG | 2 |
| VULKANOX ® HS/LG | 3 |
| ROTSIEGEL ® ZINC WHITE | 2 |
| VULKACIT ® CZ/EGC | 1.4 |
| RHENOGRAN ® IS 90-65 | 2.72 |

The following are comparative results for the compounded materials and vulcanizates of the BR/carbon black mixtures

| | Rubber Used | | | |
| --- | --- | --- | --- | --- |
| | Buna ® CB24 | Fx-PBR 1 Example 1 | Fx-PBR 2 Example 2 | Reference Example 3 |
| Compounded material ML 1 + 4 | 56.8 | 58.6 | 64.7 | 56.8 |
| Hardness [Shore A] | 60.9 | 63.6 | 64.07 | 60.6 |
| Rebound 60° C. [%] | 64.5 | 67.5 | 67.5 | 60.23 |
| Amplitude sweep 60° C. 10 Hz (MTS) | | | | |
| G* (15%) [MPa] | 1.29 | 1.,29 | 1.34 | 1.23 |
| tan δ (max.) | 0.131 | 0.12 | 0.114 | 0.119 |

-continued

| | Rubber Used | | | |
|---|---|---|---|---|
| | Buna® CB24 | Fx-PBR 1 Example 1 | Fx-PBR 2 Example 2 | Reference Example 3 |
| Dynamic damping (Eplexor) | | | | |
| tan δ (60° C.) | 0.071 | 0.069 | 0.057 | 0.066 |
| Tensile test | | | | |
| S100 [MPa] | 2.0 | 2.1 | 2.2 | 1.9 |
| S300 [MPa] | 7.8 | 8.1 | 8.6 | 7.5 |

The following substances were used for the mixture studies modified NdBR (Fx-PBR2 and Example 4) and on standard NdBR Buna® CB 24 with natural rubber and Carbon Black:

| | |
|---|---|
| BR | 70 |
| TSR/RSS 3 DEFO 700 | 30 |
| CORAX ® N 326 | 50 |
| VIVATEC ® 500 | 4 |
| EDENOR ® C 18 98-100 | 3 |
| VULKANOX ® 4020/LG | 2 |
| VULKANOX ® HS/LG | 3 |
| ZINKWEISS ROTSIEGEL | 2 |
| RHENOGRAN ® IS 90-65 | 2.7 |
| VULKACIT ® CZ/EGC | 1.4 |

The following are comparative results for the compounded materials and vulcanizates of the BR/carbon black mixtures

| | Buna ® CB24 | Example 2 | Example 4 |
|---|---|---|---|
| Compounded material ML 1 + 4 | 61.2 | 62.5 | 71.3 |
| Hardness [Shore A] | 60.9 | 64.1 | 60.6 |
| Rebound 60° C. [%] | 66.0 | 67.3 | 67.5 |
| Amplitude sweep 60° C. 10 Hz (MTS) | | | |
| G* (15%) [MPa] | 1.17 | 1.19 | 1.19 |
| tan δ (max.) | 0.129 | 0.129 | 0.121 |
| Dynamic damping (Eplexor) | | | |
| tan δ (60° C.) | 0.065 | 0.061 | 0.056 |
| Tensile test | | | |
| S300 [MPa] | 8.9 | 9.0 | 9.,8 |

In both compound studies above, the modified polymers from the inventive examples 1 and 2 and the modified and Mooney jumped polymer from the inventive example 4 show an improved rolling resistance tendency over the reference rubber, that is indicated by an increased rebound resilience at 60° C., a lower tan d (max) at the amplitude sweep at 60° C. and for example 2 and 4 also a lower tan δ (60° C.) in the dynamic damping in the Eplexor. In addition, the inventive examples 1, 2 and 4 have a higher S300 modulus in the tensile test at room temperature and a higher dynamic modulus G* at 15% amplitude sweep, that indicate a stronger network formation due to increased interactions between the polymer and the filler.

We claim:
1. A modified diene polymer comprising:
an in-chain substructure according to formula (X):

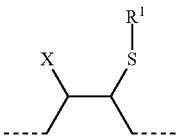

where
X is a halogen, and
R$^1$ is selected from a group consisting of
an aromatic amide moiety of formula (II):

$$C_6(R^2)_5-(C=O)-N(R^3)-C_6(R^2)_4- \quad \text{(II)}$$

where R$^2$ and R$^3$ are identical or different and are a hydrogen moiety, a linear or branched alkyl moiety having 1 to 16 carbon atoms, a phenyl moiety, or a cycloalkyl moiety having 5 to 8 carbon atoms;
a dithiazyl disulphide moiety of formula (III):

where R$^{4a}$ and R$^{4b}$ are identical or different and are a hydrogen moiety, a halogen, a nitro, a hydroxy, a linear or branched alkyl moiety having 1 to 12 carbon atoms, a linear or branched alkoxy moiety having 1 to 12 carbon atoms, a phenyl moiety, a cycloalkyl moiety having 5 to 8 carbon atoms, or together form the cyclic moiety of formula (IV):

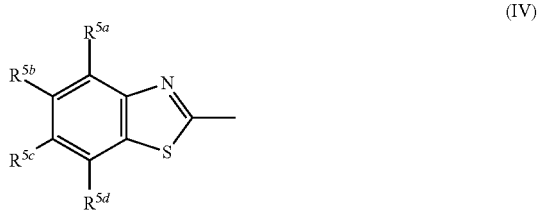

where R$^{5a}$, R$^{5b}$, R$^{5c}$, and R$^{5d}$ are identical or different and are a hydrogen moiety, a hydroxy, a linear or branched alkyl moiety having 1 to 12 carbon atoms, a linear or branched alkoxy moiety having 1 to 12 carbon atoms, a phenyl moiety, or a cycloalkyl moiety having 5 to 8 carbon atoms;
a thiuram moiety of formula (VII):

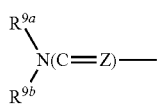

where
Z is sulphur or oxygen,
R$^{9a}$ and R$^{9b}$ are identical or different and are a hydrogen atom, a linear or branched alkyl moiety having 1 to 16 carbon atoms, a phenyl moiety, or a cycloalkyl moiety having 5 to 8 carbon atoms;

a dithioxanthogenate moiety according to formula (VIII):

$$R^{10}-O-C(=S)- \quad (VIII)$$

where $R^{10}$ is a hydrogen atom, a linear or branched alkyl moiety having 1 to 16 carbon atoms, a phenyl moiety, or a cycloalkyl moiety having 5 to 8 carbon atoms; and a phosphonate moiety according to formula (IX):

$$(R^{11a}-O)(R^{11b}-O)P(Z)- \quad (IX)$$

where

Z is a sulphur or oxygen atom, and $R^{11a}$ and $R^{11b}$ are identical or different and are a hydrogen atom, a linear or branched alkyl moiety having 1 to 16 carbon atoms, a phenyl moiety, or a cycloalkyl moiety having 5 to 8 carbon atoms.

2. The modified diene polymer according to claim 1, further comprising a sulfur bridge between polymeric chains according to formula (XII):

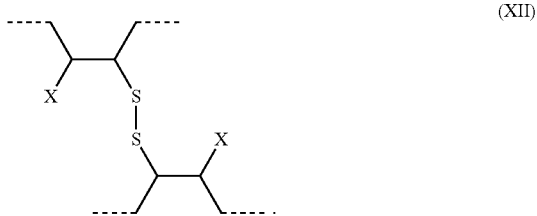

(XII)

3. The modified diene polymer according to claim 1, wherein the modified diene polymer is a diene homopolymer, a diene copolymer obtained via copolymerization of at least one conjugated diene monomers or a diene copolymer obtained via copolymerization of at least one conjugated diene monomers with at least one vinylaromatic co-monomers.

4. The modified diene polymer according to claim 1, wherein the modified diene polymer is a polybutadiene-styrene copolymer or a polybutadiene.

5. A rubber mixture comprising the modified diene polymer according to claim 1 and 10 to 500 parts by weight of filler, based on 100 parts by weight of the modified diene polymer.

6. The rubber mixture according to claim 5, further comprising at least one of one or more of a rubber auxiliary and at least one further rubber different from the modified diene polymer.

7. A vulcanizable composition comprising:
the rubber mixture according to claim 5, and
at least one crosslinking system comprising at least one crosslinker and optionally one or more crosslinking accelerators.

8. A process for producing vulcanizates, the process comprising vulcanizing the vulcanizable composition according to claim 7.

9. The process according to claim 8, wherein the vulcanizing is performed at a temperature of 100° C. to 200° C.

10. The process according to claim 8, wherein the vulcanizing is performed at a temperature of 120° C. to 190° C.

11. A vulcanizate obtained by the process according to claim 8.

12. The vulcanizate according to claim 11, wherein the vulcanizate is in the form of a shaped body, a drive belt, a roller covering, a seal, a cap, a stopper, a hose, a floor covering, a sealing mat, a sealing sheet, a sealing profile, or a sealing membranes.

13. The vulcanizate according to claim 11, wherein the vulcanizate is in the form of a tire, a tire tread or a layers of a tire tread.

14. The modified diene polymer according to claim 1, comprising:

the in-chain substructure according to formula (X):

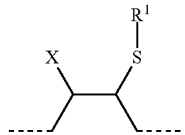

(X)

where

X is selected from a chlorine atom, a bromine atom, and an iodine atom, and $R^1$ is selected from:

an aromatic amide moiety of formula (II):

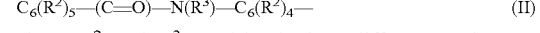

$$C_6(R^2)_5-(C=O)-N(R^3)-C_6(R^2)_4- \quad (II)$$

where $R^2$ and $R^3$ are identical or different and are a hydrogen moiety, a linear or branched alkyl moiety having 1 to 8 carbon atoms, a phenyl moiety, or a cycloalkyl moiety having 5 to 8 carbon atoms;

a dithiazyl disulphide moiety of formula (III):

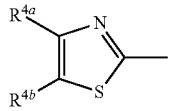

(III)

where $R^{4a}$ and $R^{4b}$ are identical or different and are a hydrogen moiety, a halogen, a nitro, a hydroxy, a linear or branched alkyl moiety having 1 to 8 carbon atoms, a linear or branched alkoxy moiety having 1 to 8 carbon atoms, a phenyl moiety, a cycloalkyl moiety having 5 to 8 carbon atoms, or together form the cyclic moiety of formula (IV):

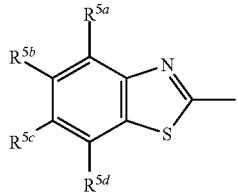

(IV)

where $R_{5a}$, $R_{5b}$, $R_{5c}$, and $R_{5d}$ are identical or different and are a hydrogen moiety, a hydroxy, a linear or branched alkyl moiety having 1 to 8 carbon atoms, a linear or branched alkoxy moiety having 1 to 8 carbon atoms, a phenyl moiety, or a cycloalkyl moiety having 5 to 8 carbon atoms;

a thiuram moiety of formula (VII):

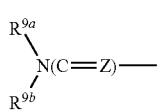

(VII)

where
Z is sulphur or oxygen,
R$^{9a}$ and R$^{9b}$ are identical or different and are a hydrogen atom, a linear or branched alkyl moiety having 1 to 8 carbon atoms, a phenyl moiety, or a cycloalkyl moiety having 5 to 8 carbon atoms;
a dithioxanthogenate moiety according to formula (VIII):

$$R^{10}-O-C(=S)-  \quad (VIII)$$

where R$^{10}$ is a hydrogen atom, a linear or branched alkyl moiety having 1 to 8 carbon atoms, a phenyl moiety, or a cycloalkyl moiety having 5 to 8 carbon atoms; and
a phosphonate moiety according to formula (IX):

$$(R^{11a}-O)(R^{11b}-O)P(Z)-  \quad (IX)$$

where
Z is a sulphur or oxygen atom,
R$^{11a}$ and R$^{11b}$ are identical or different and are a hydrogen atom, a linear or branched alkyl moiety having 1 to 8 carbon atoms, a phenyl moiety, or a cycloalkyl moiety having 5 to 8 carbon atoms.

15. A process for producing a modified diene polymer, the process comprising reacting a diene polymer with at least one halogenated sulphidic organic compound, wherein the at least one halogenated sulphidic organic compound is formed by reacting a halogen with at least one sulphidic compound having at least one of formula (I-a), (I-b), and (I-c):

$$R^{1a}-S-S-R^{1b} \quad (I\text{-}a),$$

$$R^{1a}-S-(S)_n-S-R^{1b}, \text{ where } 1 \leq n \leq 8 \quad (I\text{-}b),$$

$$R^{1a}-SH \quad (I\text{-}c),$$

where R$^{1a}$ and R$^{1b}$ are identical or different and selected from a group consisting of:
an aromatic amide moiety of formula (II):

$$C_6(R^2)_5-(C=O)-N(R^3)-C_6(R^2)_4- \quad (II)$$

where R$^2$ and R$^3$ are identical or different and are a hydrogen moiety, a linear or branched alkyl moiety having 1 to 16 carbon atoms, a phenyl moiety, or a cycloalkyl moiety having 5 to 8 carbon atoms;
a dithiazyl disulphide moiety of formula (III):

where R$^{4a}$ and R$^{4b}$ are identical or different and are a hydrogen moiety, a halogen, a nitro, a hydroxy, a linear or branched alkyl moiety having 1 to 12 carbon atoms, a linear or branched alkoxy moiety having 1 to 12 carbon atoms, a phenyl moiety, a cycloalkyl moiety having 5 to 8 carbon atoms, or together form the cyclic moiety of formula (IV):

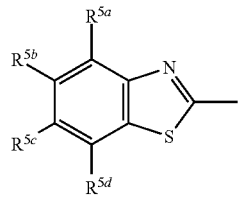

where R$^{5a}$, R$^{5b}$, R$^{5c}$, and R$^{5d}$ are identical or different and are a hydrogen moiety, a hydroxy, a linear or branched alkyl moiety having 1 to 12 carbon atoms, a linear or branched alkoxy moiety having 1 to 12 carbon atoms, a phenyl moiety, or a cycloalkyl moiety having 5 to 8 carbon atoms;
a thiuram moiety of formula (VII):

where
Z is sulphur or oxygen,
R$^{9a}$ and R$^{9b}$ are identical or different and are a hydrogen atom, a linear or branched alkyl moiety having 1 to 16 carbon atoms, a phenyl moiety, or a cycloalkyl moiety having 5 to 8 carbon atoms;
a dithioxanthogenate moiety according to formula (VIII):

$$R^{10}-O-C(=S)- \quad (VIII)$$

where R$^{10}$ is a hydrogen atom, a linear or branched alkyl moiety having 1 to 16 carbon atoms, a phenyl moiety, or a cycloalkyl moiety having 5 to 8 carbon atoms;
a phosphonate moiety according to formula (IX):

$$(R^{11a}-O)(R^{11b}-O)P(Z)- \quad (IX)$$

where
Z is a sulphur or oxygen atom, and
R$^{11a}$ and R$^{11b}$ are identical or different and are a hydrogen atom, a linear or branched alkyl moiety having 1 to 16 carbon atoms, a phenyl moiety, or a cycloalkyl moiety having 5 to 8 carbon atoms.

16. The process according to claim 15, wherein the modified diene polymer is formed via polymerization of at least one conjugated diene monomer, or polymerization of at least one conjugated diene monomer with at least one vinylaromatic co-monomer.

17. The process according to claim 15, further comprising reacting the diene polymer with a Mooney jump functionalization reagent.

18. The process according to claim 17, wherein the Mooney jump functionalization reagent is S$_2$Cl$_2$.

19. A modified diene polymer obtained according to the process of claim 15.

* * * * *